(12) United States Patent
Pinarbasi

(10) Patent No.: US 7,436,635 B2
(45) Date of Patent: Oct. 14, 2008

(54) CURRENT PERPENDICULAR TO PLANE (CPP) MAGNETORESISTIVE SENSOR HAVING A HIGHLY CONDUCTIVE LEAD STRUCTURE

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/320,444

(22) Filed: Dec. 27, 2005

(65) Prior Publication Data

US 2006/0114615 A1      Jun. 1, 2006

Related U.S. Application Data

(63) Continuation-in-part of application No. 10/630,817, filed on Jul. 29, 2003, now Pat. No. 7,038,890.

(51) Int. Cl.
*G11B 5/39* (2006.01)

(52) U.S. Cl. ..................................... 360/322

(58) Field of Classification Search ................. 360/322
See application file for complete search history.

(56) References Cited

U.S. PATENT DOCUMENTS

| 5,966,012 | A | * | 10/1999 | Parkin | 324/252 |
|---|---|---|---|---|---|
| 6,268,985 | B1 | * | 7/2001 | Pinarbasi | 360/324.12 |
| 2002/0191356 | A1 | * | 12/2002 | Hasegawa et al. | 360/324.11 |
| 2003/0011364 | A1 | * | 1/2003 | Hosomi et al. | 324/252 |
| 2004/0001976 | A1 | * | 1/2004 | Saito | 428/694 SC |
| 2004/0160709 | A1 | * | 8/2004 | Lin et al. | 360/324.12 |
| 2006/0022227 | A1 | * | 2/2006 | Horng et al. | 257/272 |

OTHER PUBLICATIONS

Hoshino K. et al, "CPP-GMR with oxidized CoFe layer on various lower-electrode materials", IEEE Transactions on Magnetics, v. 41, No. 10, Oct. 2005, pp. 2926-2928.*
"Advanced Spin-Valve GMR Head" Fujitsi Sci. Tech. J., 37, 2, p. 174-182, Dec. 2001, Kenai et al.
"CPP Operational Mode of GRM Head" Fujitsi Sci. Tech. J., 37, 2, p. 192-200, Dec. 2001, Nagasaka et al.
"Spin Valve Read Heads For Magnetic Recording" Carnegie Mellon Materials Science and Engineering Seminar, Sep. 2001, Lee.

* cited by examiner

*Primary Examiner*—Julie Anne Watko
(74) *Attorney, Agent, or Firm*—Zilka-Kotab, PC

(57) ABSTRACT

A current perpendicular to plane (CPP) sensor having a sensor stack lead layer that is resistant to corrosion. The sensor includes a sensor stack having a capping layer at its top. A lead layer constructed of a non-corroding material such as Ru, Rh, Au or some similar material is formed over the capping layer. A magnetic shield material such a NiFe can then be deposited over the lead layer. The non-corroding lead material prevents the cap layer from corroding, preventing corrosion from causing parasitic resistance in the area in and around the lead and capping layers, thereby increasing sensor performance and reliability.

12 Claims, 16 Drawing Sheets

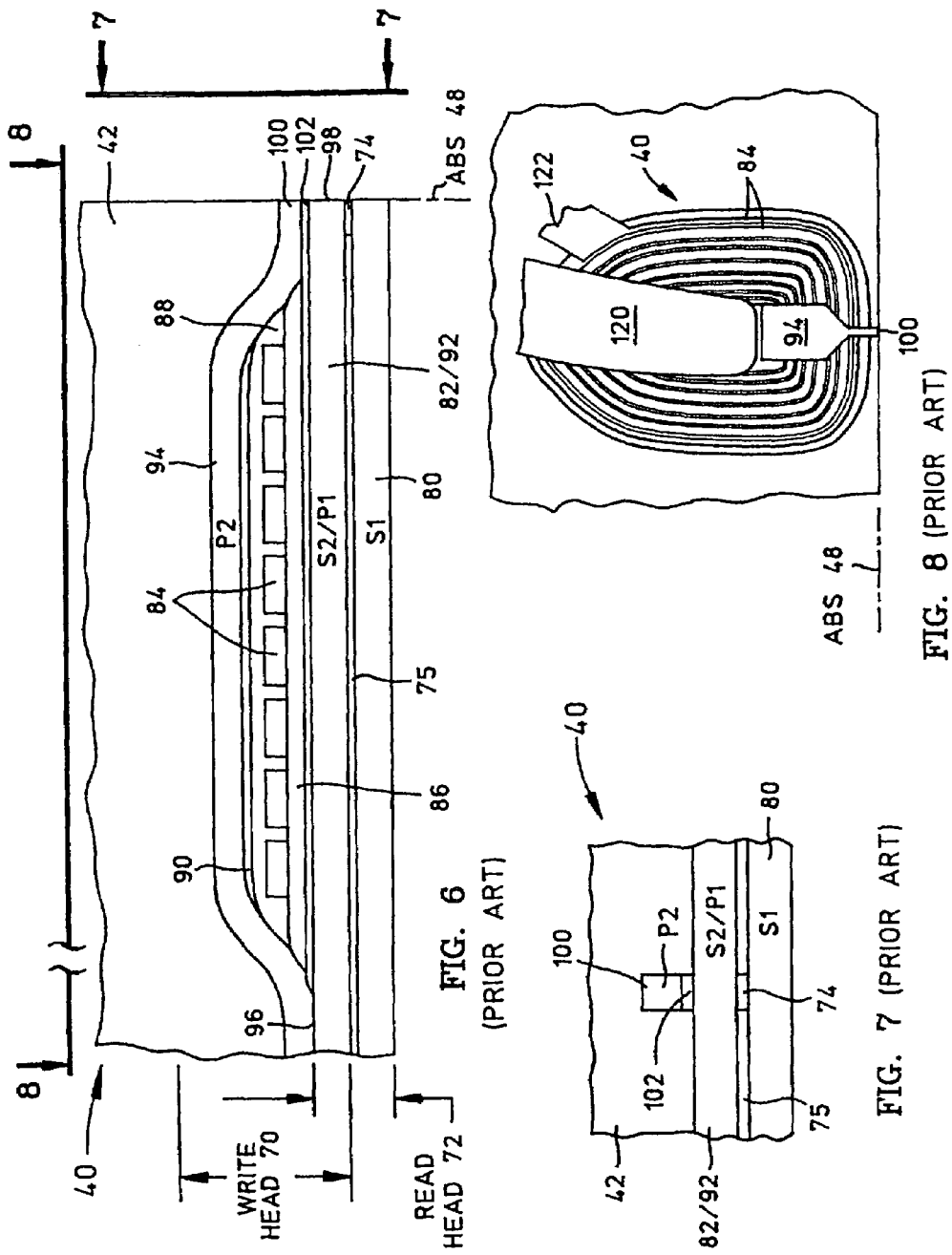

US 7,436,635 B2

CURRENT PERPENDICULAR TO PLANE (CPP) MAGNETORESISTIVE SENSOR HAVING A HIGHLY CONDUCTIVE LEAD STRUCTURE

This is a Continuation in Part of Ser. No. 10/630,817, now U.S. Pat. No. 7,038,890, Filed Jul. 29, 2003, issued on May 2, 2006 entitled CURRENT PERPENDICULAR TO THE PLANES (CPP) SENSOR WITH A HIGHLY CONDUCTIVE CAP STRUCTURE, which is incorporated by reference as if fully set forth herein.

BACKGROUND OF THE INVENTION

1. Field of the Invention

The present invention relates to a current perpendicular to the planes (CPP) sensor with a highly conductive cap structure and, more particularly, to such a lead structure which includes ruthenium (Ru), rhodium (Rh) or gold (Au) and a method of making.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. When the disk is not rotating the actuator arm parks the suspension arm and slider on a ramp. When the disk rotates and the slider is positioned by the actuator arm above the disk, air is swirled by the rotating disk adjacent an air bearing surface (ABS) of the slider causing the slider to ride on an air bearing a slight distance from the surface of the rotating disk. The ABS is an exposed surface of the slider and the write and read heads that faces the rotating disk. When the slider rides on the air bearing, the actuator arm positions the write and read heads over the selected circular tracks on the rotating disk where field signals are written and read by the write and read heads. The read and write heads are connected to processing circuitry that operates according to a computer program to implement the writing and reading functions.

An exemplary high performance read head employs a current perpendicular to the planes (CPP) sensor, such as a magnetic tunnel junction (MTJ) sensor, for sensing the magnetic field signals from the rotating magnetic disk. The MTJ sensor includes an insulative tunneling or barrier spacer layer sandwiched between a ferromagnetic pinned layer and a ferromagnetic free layer. An antiferromagnetic pinning layer interfaces the pinned layer for pinning the magnetic moment of the pinned layer 90° to the air bearing surface (ABS). The MTJ sensor is located between ferromagnetic first and second shield layers. First and second leads, which may be the first and second shield layers, are connected to the MTJ sensor for conducting a tunneling current therethrough. The tunneling current is conducted perpendicular to the major film planes (CPP) of the sensor as contrasted to a spin valve sensor where the sense current is conducted parallel to or, otherwise stated, conducted in the planes of the major thin film planes (CIP) of the spin valve sensor. Another type of CPP sensor employs a nonmagnetic conductive material for the spacer layer instead of an insulation material. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, occurs when the tunneling current is conducted through the sensor without magnetic field signals from the rotating magnetic disk.

When the magnetic moments of the pinned and free layers are parallel with respect to one another the resistance of the MTJ sensor to the tunneling current ($I_T$) is at a minimum and when the magnetic moments are antiparallel the resistance of the MTJ sensor to the tunneling current is at a maximum. Changes in resistance of the sensor is a function of cos θ, where θ is the angle between the magnetic moments of the pinned and free layers. When the tunneling current ($I_T$) is conducted through the sensor, resistance changes, due to field signals from the rotating magnetic disk, cause potential changes that are detected and processed as playback signals. The sensitivity of the sensor is quantified as magnetoresistive coefficient dr/R where dr is the change in resistance of the sensor from minimum resistance (magnetic moments of free and pinned layers parallel) to maximum resistance (magnetic moments of the free and pinned layers antiparallel) and R is the resistance of the MTJ sensor at minimum resistance. The dr/R of a MTJ sensor can be as high as several hundred percent as compared to 20% for a spin valve sensor.

MTJ sensors are classified as either a top sensor or a bottom sensor. In a bottom sensor the pinning layer is closer to the first shield layer than the second shield layer and in a top sensor the pinning layer is closer to the second shield layer than to the first shield layer. In either type of sensor the first and second shield layers may engage the bottom and the top respectively of the sensor so that the first and second shield layers serve as leads for conducting the tunneling current through the sensor perpendicular to the major planes of the layers of the sensor. The sensor has first and second side surfaces which are normal to the ABS. First and second hard bias layers are adjacent the first and second side surfaces respectively for longitudinally biasing the free layer in a single domain state. This longitudinal biasing also maintains the magnetic moment of the free layer parallel to the ABS when the read head is in the quiescent condition.

In CIP devices, it is desired that a maximum amount of the current flow in the free and pinned layers interfacing the spacer layer and that current shunting through seed layers and capping layers of the sensor be minimized or eliminated. In MTJ devices, however, these layers need to be very conductive for maximum efficiency. Because the sense current in MTJ devices flows perpendicular to the thin film planes the conductance of the bottom and top layers of the sense layer is critical for optimum and reliable operation of these devices. In today's MTJ devices tantalum is used as a capping layer as well as a lead layer which is a source of concern for high resistivity and process complexity. Because of a high affinity to oxygen, the tantalum layer will always be a concern for reliable performance. During atmosphere exposure, the tantalum layer oxidizes and resistivity increases by many orders of magnitude. This oxidized layer must be milled away to ensure good electrical conductance. The milling process is not precise and variation in the amount of milled material deteriorates the gap control. For future MTJ devices this can be critical for accurate control of the read gap.

SUMMARY OF THE INVENTION

The present invention provides a CPP sensor, such as a MTJ sensor including a sensor stack having first and second laterally opposed sides and top and bottom surfaces extending between the first and second sides. The sensor stack may have a capping layer formed at its top. An electrically conductive lead material is formed over the top of the sensor stack (over the capping layer) and an electrically conductive magnetic shield material is formed over the lead layer.

The electrically conductive lead layer may be constructed of a material that is resistant to corrosion or that has an electrically conductive oxide. The lead material may be constructed of, for example Ru, Rh, Au, Pt or some other similar material. The lead layer and the shield may extend beyond the laterally opposed sides of the sensor, as opposed to the cap, which terminates at the sides of the sensor stack.

The capping layer may be constructed of Ta, or may be constructed of a material such as Rh, Ru, Au etc. The capping layer may also be constructed of a layer of Ta and a layer of material such as Rh, Ru, Au, Pt etc.

The non-corrosive lead layer advantageously prevents the capping layer or other sensor layers from corroding, as well as not corroding itself. In this way, the novel lead structure ensures that parasitic resistance in and around the lead will be minimized. Sensor performance and reliability are thereby greatly improved.

Other aspects of the invention will be appreciated upon reading the following description taken together with the accompanying drawings wherein the various figures are not to scale with respect to one another nor are they to scale with the respect to the structure depicted therein.

BRIEF DESCRIPTION OF THE DRAWINGS

FIG. 6 is a partial view of the slider and a merged magnetic head as seen in plane 6-6 of FIG. 2;

FIG. 7 is a partial ABS view of the slider taken along plane 7-7 of FIG. 6 to show the read and write elements of the merged magnetic head;

FIG. 8 is a view taken along plane 8-8 of FIG. 6 with all material above the coil layer and leads removed;

DESCRIPTION OF THE PREFERRED EMBODIMENTS

Magnetic Disk Drive

Figure 1:
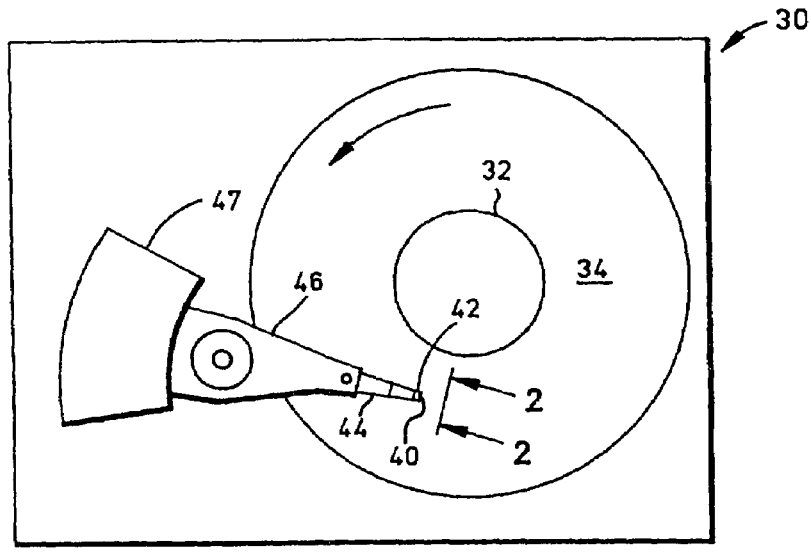
FIG. 1 is a plan view of an exemplary magnetic disk drive.
Figure 2:
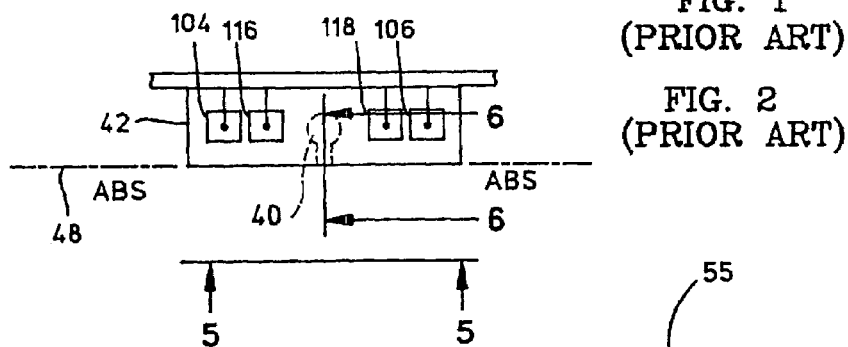
FIG. 2 is an end view of a slider with a magnetic head of the disk drive as seen in plane 2-2 of FIG. 1.
Figure 3:
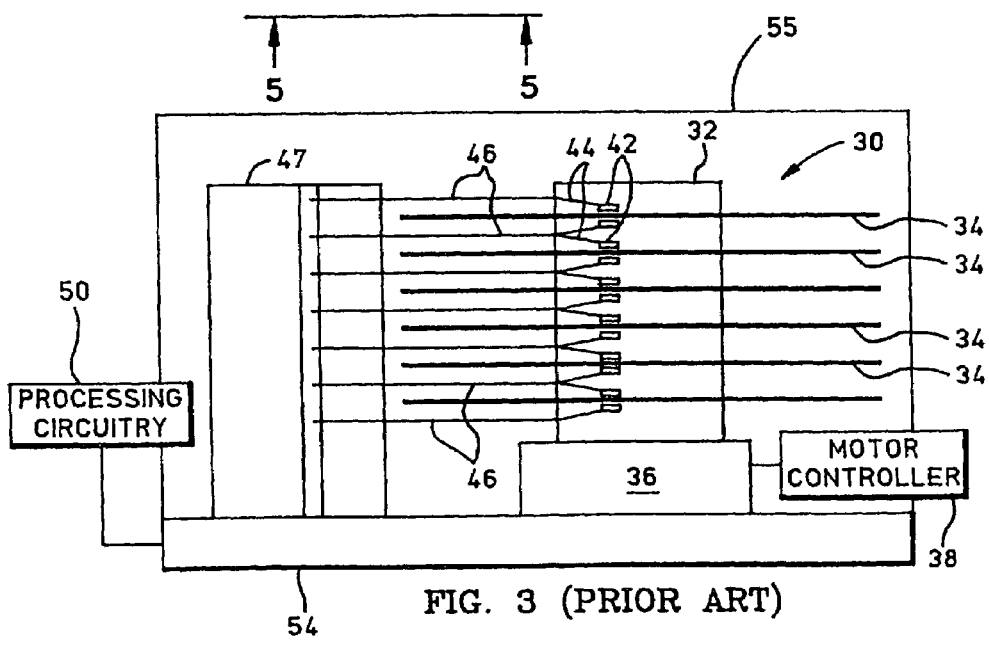
FIG. 3 is an elevation view of the magnetic disk drive wherein multiple disks and magnetic heads are employed.
Figure 4:
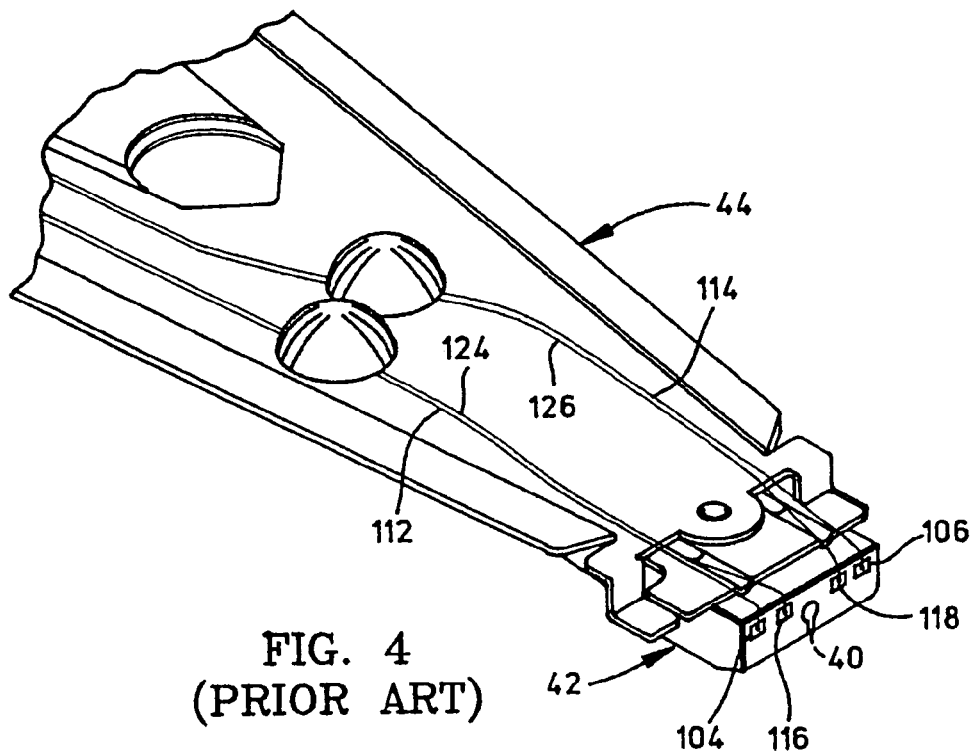
FIG. 4 is an isometric illustration of an exemplary suspension system for supporting the slider and magnetic head.

Referring now to the drawings wherein like reference numerals designate like or similar parts throughout the several views, FIGS. 1-3 illustrate a magnetic disk drive 30. The drive 30 includes a spindle 32 that supports and rotates one or more magnetic disks 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
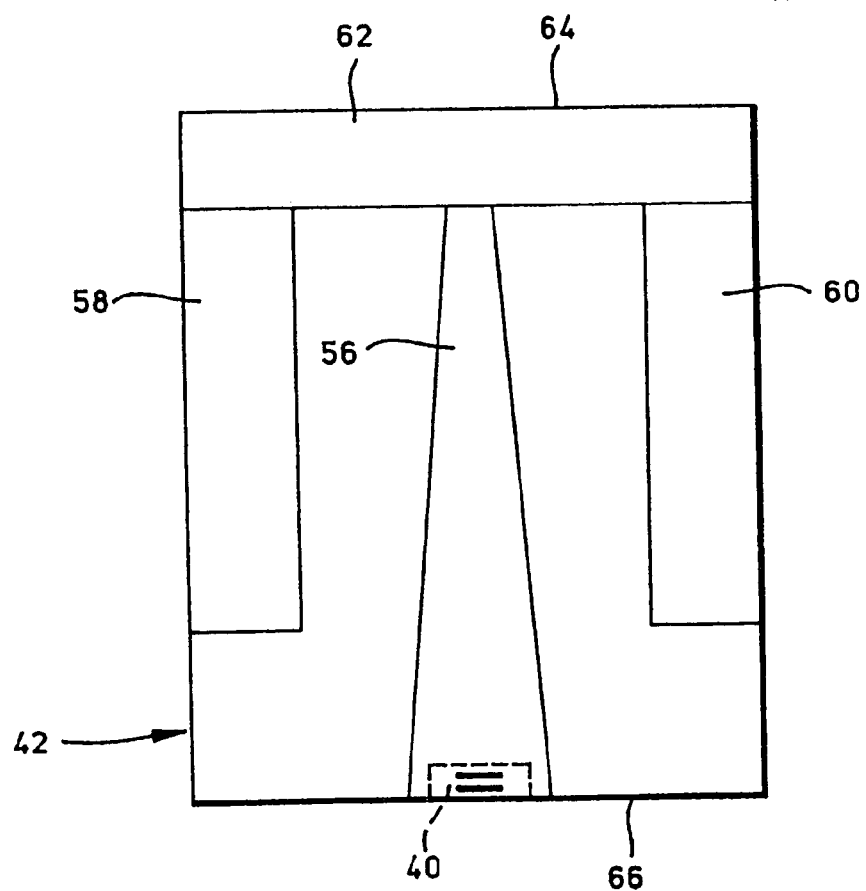
FIG. 5 is an ABS view of the magnetic head taken along plane 5-5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a current perpendicular to the planes (CPP) sensor of the present invention, such as a magnetic tunnel junction (MTJ) sensor 74. FIG. 7 is an ABS view of FIG. 6. The sensor 74 is sandwiched between ferromagnetic first and second shield layers 80 and 82. In response to external magnetic fields, the resistance of the sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) is conducted through the sensor 74 perpendicular to the planes of its major film surfaces by the first and second shield layers 80 and 82 which serve as first and second leads.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. In a piggyback head (not shown) the second shield layer 82 and the first pole piece layer 92 are separate layers and an insulation layer is located therebetween. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
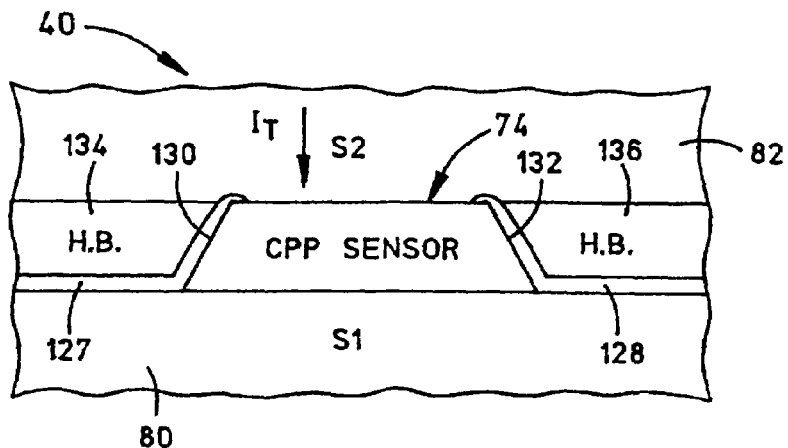
FIG. 9 is an enlarged ABS illustration of the read head with a CPP sensor.

FIG. 9 is an enlarged isometric ABS illustration of the read head 40 shown in FIG. 7. The read head 40 includes the CPP sensor 74. First and second insulation layers 127 and 128, such as alumina ($Al_2O_3$), cover the first shield layer 80 on each side of the sensor 74 as well as slightly covering first and second side walls 130 and 132 of the sensor. First and second hard bias layers 134 and 136 are on the insulation layers 127 and 128 and are adjacent the side walls 130 and 132. The hard bias layers 134 and 136 cause magnetic fields to extend longitudinally through the sensor 74 for stabilizing the sensor. The sensor 74 and the first and second hard bias layers 134 and 136 are located between ferromagnetic first and second shield layers 80 and 82 which may serve as leads for conducting the tunneling current IT through the sensor 74.

Figure 10:
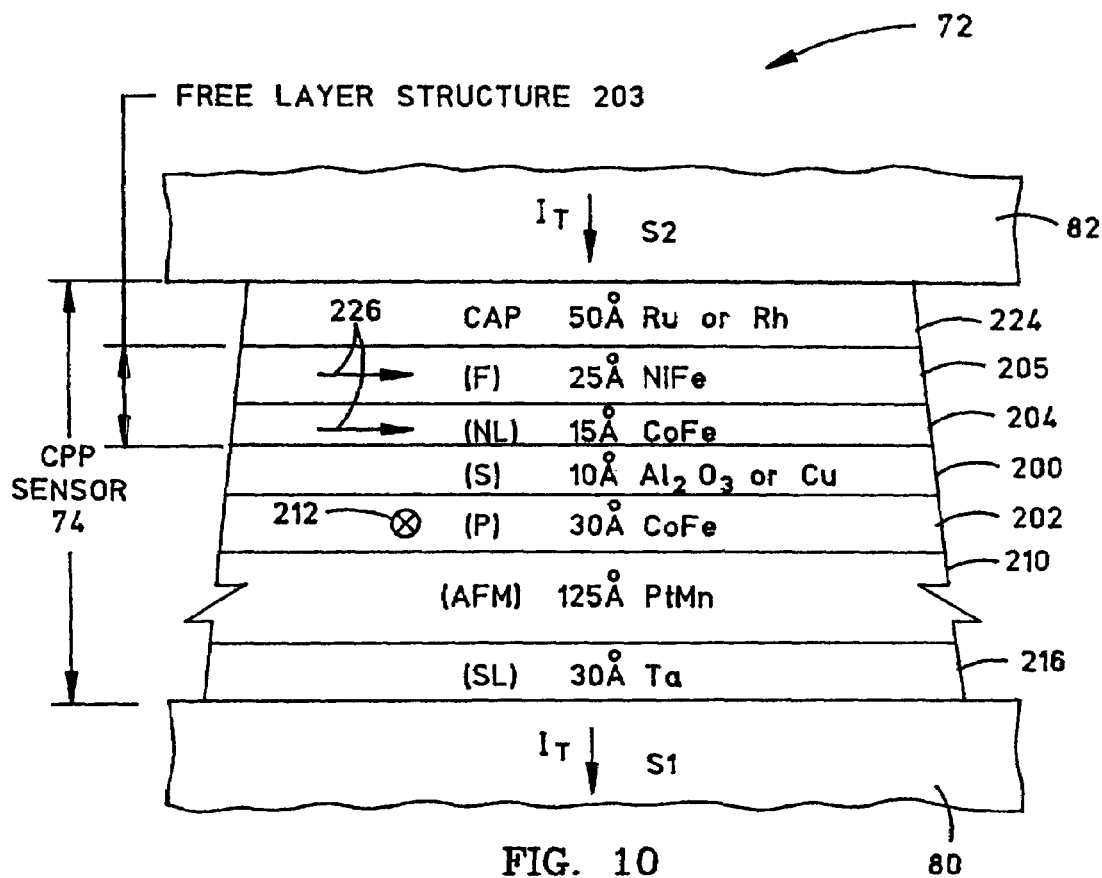
FIG. 10 is an enlarged ABS illustration of the read head with a bottom CPP sensor which has a first embodiment of the cap layer structure.

FIG. 10 is an enlarged ABS illustration of one embodiment of the present CPP sensor 74 which is located between the first and second shield layers 80 and 82. The sensor 74, which is a bottom sensor, includes a spacer layer (S) 200, such as an oxide barrier layer of $Al_2O_3$ or a nonmagnetic conductive layer of Cu, which is located between a pinned layer (P) 202 and a free layer structure 203. When the spacer layer is an oxide barrier layer the sensor is a MTJ sensor. The pinned layer 202 is preferably cobalt iron ($Co_{50}Fe_{50}$) which has a high magnetostriction so that after lapping the head the pinned layer 202 has a stress-induced anisotropy perpendicular to the ABS which supports an exchange coupling between a pinning layer 210 and the pinned layer 202. The pinning layer 210 pins a magnetic moment 212 of the pinned layer perpendicular to the ABS optionally out of the head or into the head as shown in FIG. 10. A seed layer (SL) of tantalum (Ta) 216 may be located between the pinning layer 210 and the first shield layer 80 for improving the microstructure of the layers of the sensor deposited thereon. The free layer structure 203 may include a nanolayer (NL) 204 of cobalt iron (CoFe) and a free layer (F) 205 of nickel iron (NiFe). A first embodiment of a cap layer structure 224, which will be discussed in more detail hereinbelow, is located on the free layer structure 203 for protecting the free layer structure from subsequent processing steps.

The free layer structure 203 has a magnetic moment 226 which is directed optionally from right to left or from left to right, as shown in FIG. 10. When a field signal from the rotating magnetic disk rotates the magnetic moment 226 of the free layer structure into the head the magnetic moments 226 and 212 become more parallel which reduces the resistance of the sensor to the tunneling current ($I_T$) and when the field signal rotates the magnetic moment 226 out of the head the magnetic moments 226 and 212 become more antiparallel which increases the resistance of the sensor to the tunneling current ($I_T$). These resistance changes are processed as playback signals by the processing circuitry 50 in FIG. 3.

Exemplary thicknesses of the layers are 30 Å of tantalum (Ta) for the seed layer 216, 150 Å of platinum manganese ($Pt_{50}Mn_{50}$) for the pinning layer 210, 30 Å of cobalt iron ($Co_{50}Fe_{50}$) for the layer 202, 10 Å of aluminum oxide ($Al_2O_3$) or copper (Cu) for the spacer layer 200, 15 Å of cobalt iron ($Co_{90}Fe_{10}$) for the nanolayer 204 and 25 Å of nickel iron ($Ni_{83}Fe_{17}$) for the free layer 205.

The cap layer structure 224 is ruthenium (Ru) or rhodium (Rh) and may be 50 Å thick in order to protect the top surface of the layer 205 from subsequent processing steps. In this embodiment of the invention the prior art tantalum (Ta) cap layer with a top tantalum oxide (TaO) film has been obviated. The absence of tantalum oxide (TaO) reduces the resistance of the sensor to the tunneling current $I_T$. The thickness of the ruthenium (Ru) or rhodium (Rh) cap layer 224 may be in a range from 10 Å to 200 Å.

Figure 11:
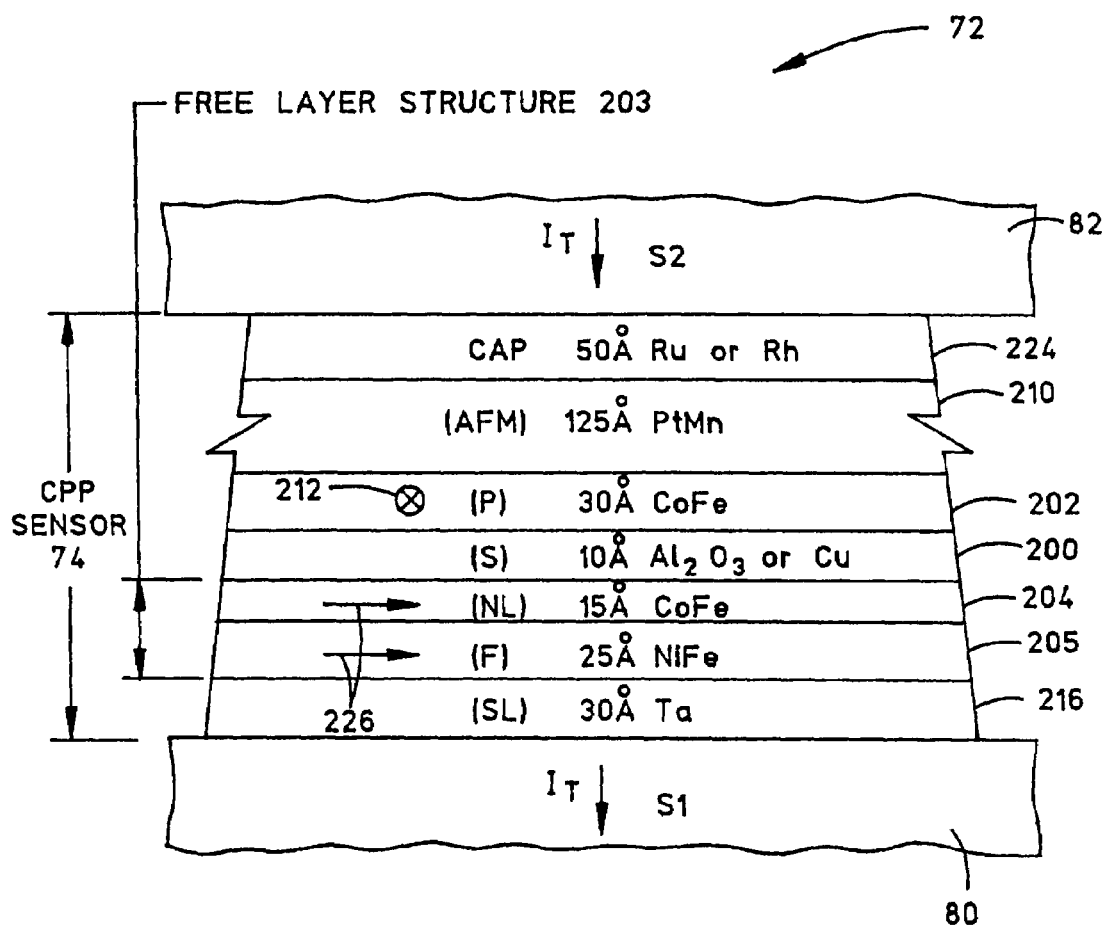
FIG. 11 is an enlarged ABS illustration of the read head with a top CPP sensor which has the first embodiment of the cap layer structure.

The CPP sensor 74 in FIG. 11 is the same as the sensor 74 in FIG. 10 except the layers 210, 202, 200, 204 and 205 have been inverted. The sensor 74 in FIG. 11 is referred to in the art as a top sensor whereas the sensor in FIG. 10 is referred to as a bottom sensor. The cap layer structure 224 in FIG. 11 may be the same as the cap layer structure 224 in FIG. 10.

Figure 12:
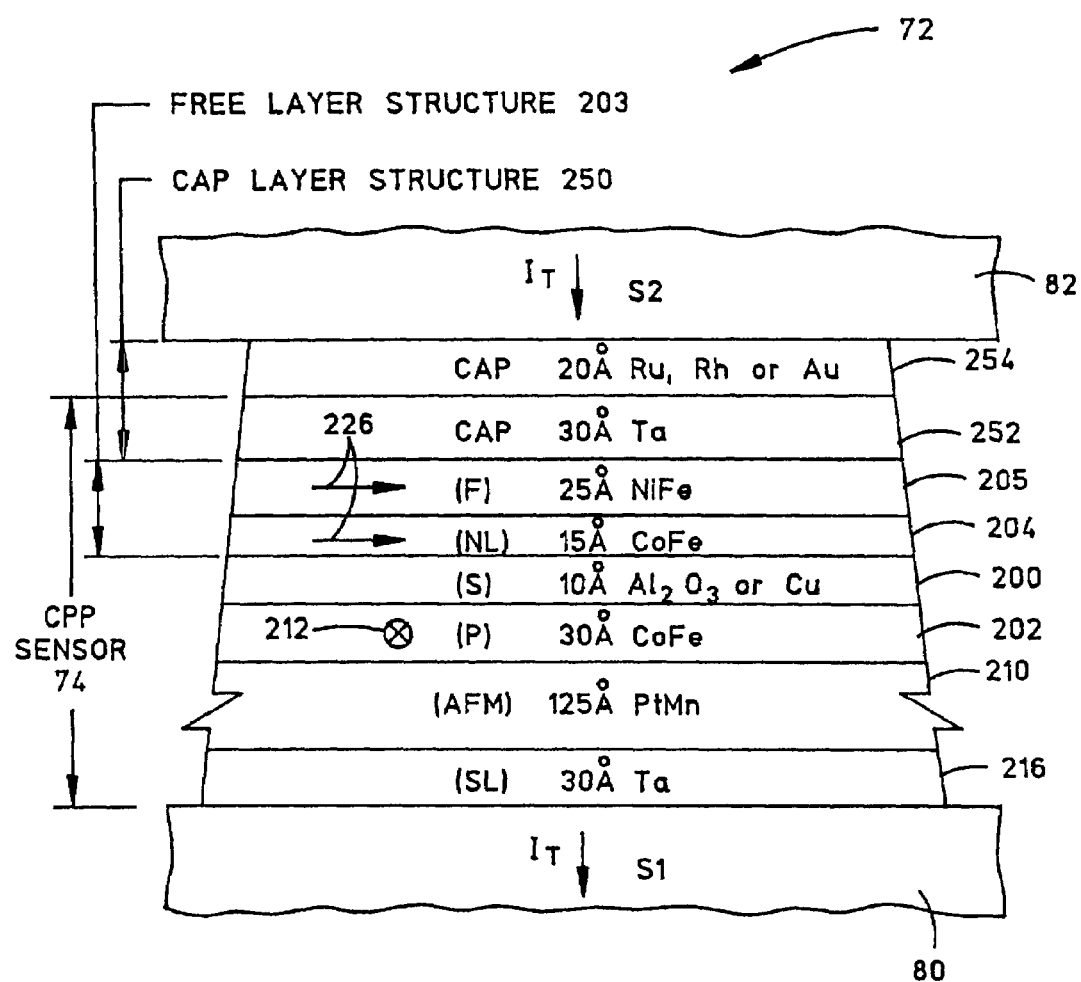
FIG. 12 is the same as FIG. 10 except a second embodiment of the cap layer structure is illustrated.

The read head 72 in FIG. 12 is the same as the read head 72 in FIG. 10 except for the cap layer structure 250. The cap layer structure 250 includes a first layer of only tantalum (Ta) 252 on the free layer 205 and a second layer of ruthenium (Ru), rhodium (Rh) or gold (Au) 254 on the first layer 252. It should be noted that the layer 252 is only tantalum (Ta) and does not have a tantalum oxide (TaO) film thereon. A method of fabricating these layers will be discussed in more detail hereinafter with reference to FIGS. 14 and 15. The exemplary thickness of the layer 252 is 30 Å and the thickness of the second layer 254 should be at least 20 Å.

Figure 13:
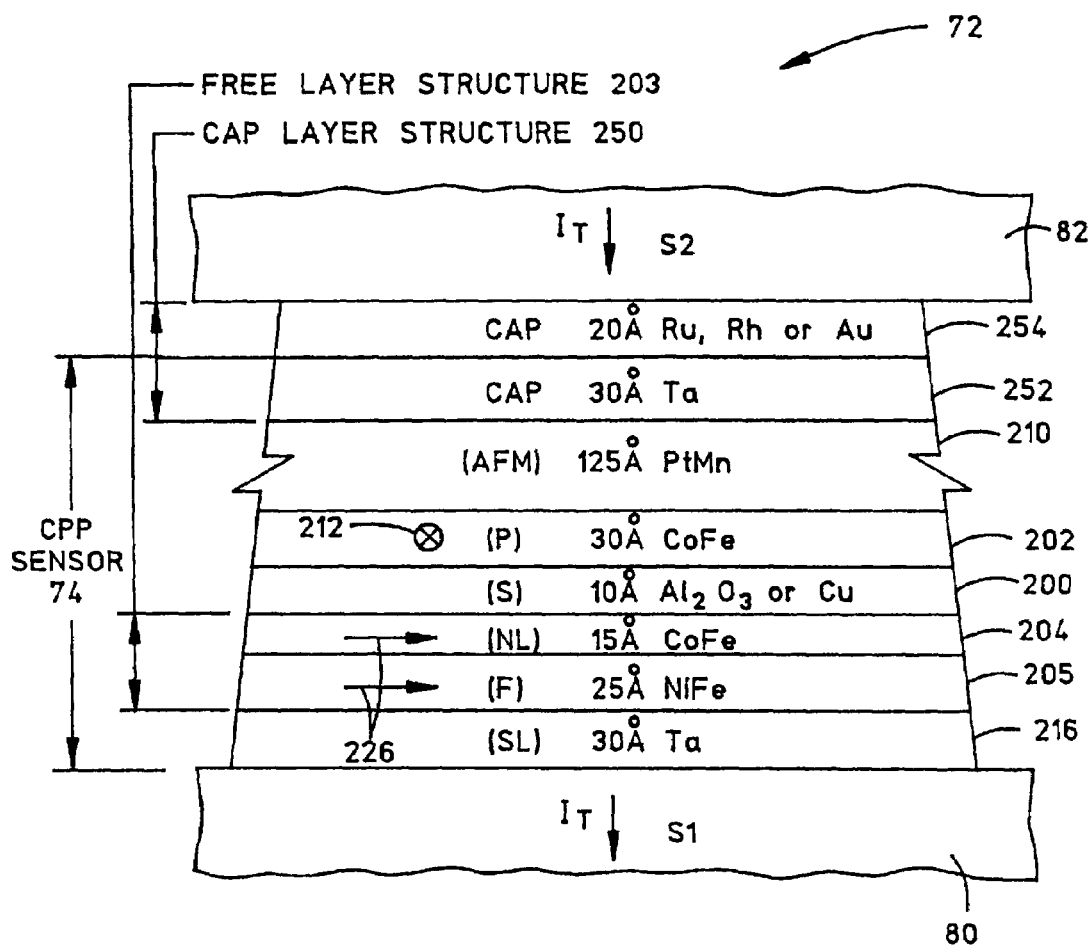
FIG. 13 is the same as FIG. 11 except the second embodiment of the cap layer structure is illustrated.

The CPP sensor 74 in FIG. 13 is the same as the CPP sensor in FIG. 11 except for the cap layer structure 250 described in detail hereinabove.

Method of Making

Figure 14:
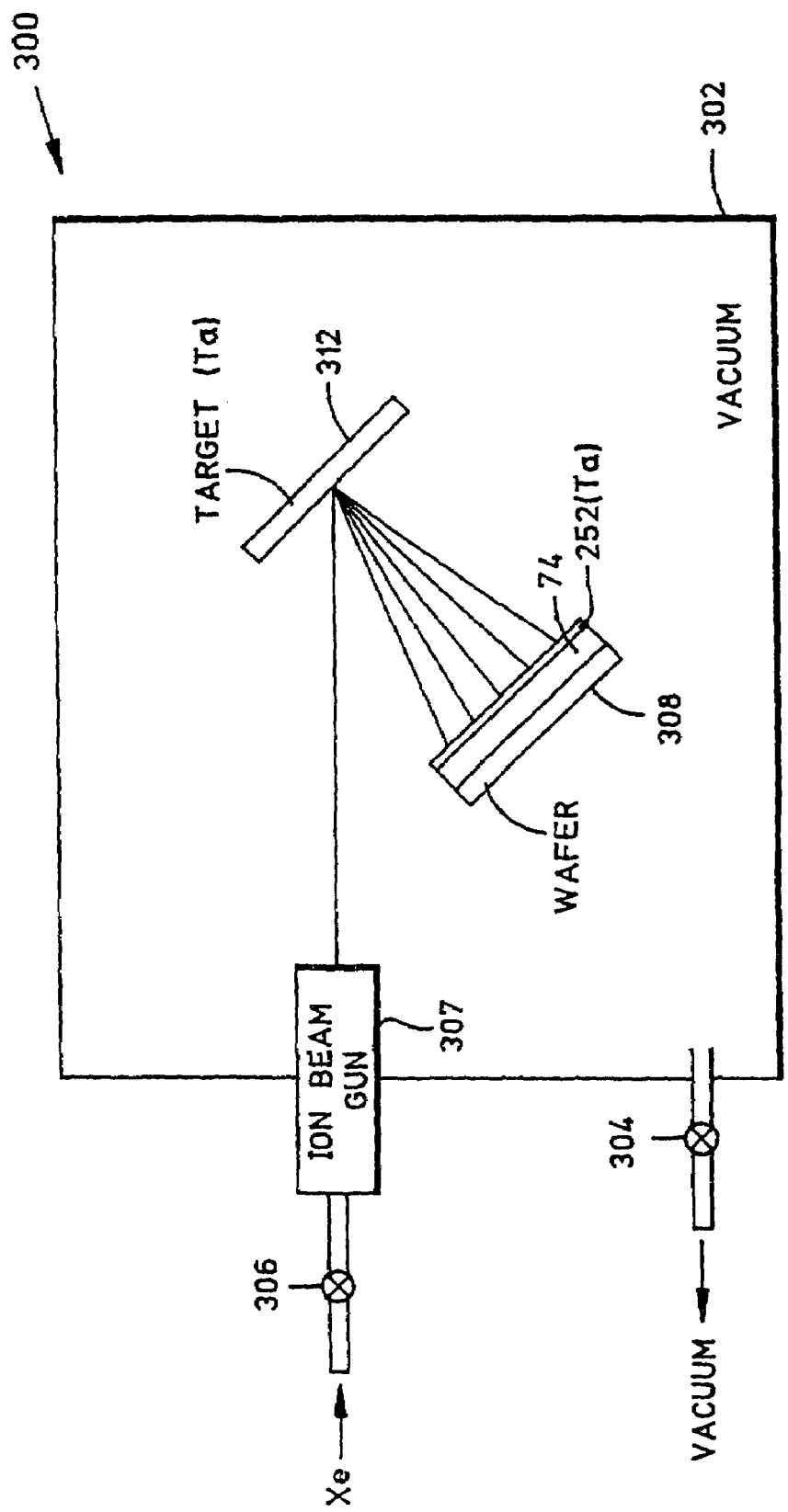
FIG. 14 is a schematic illustration of a sputtering chamber sputtering the first layer of the cap layer structure.
Figure 15:
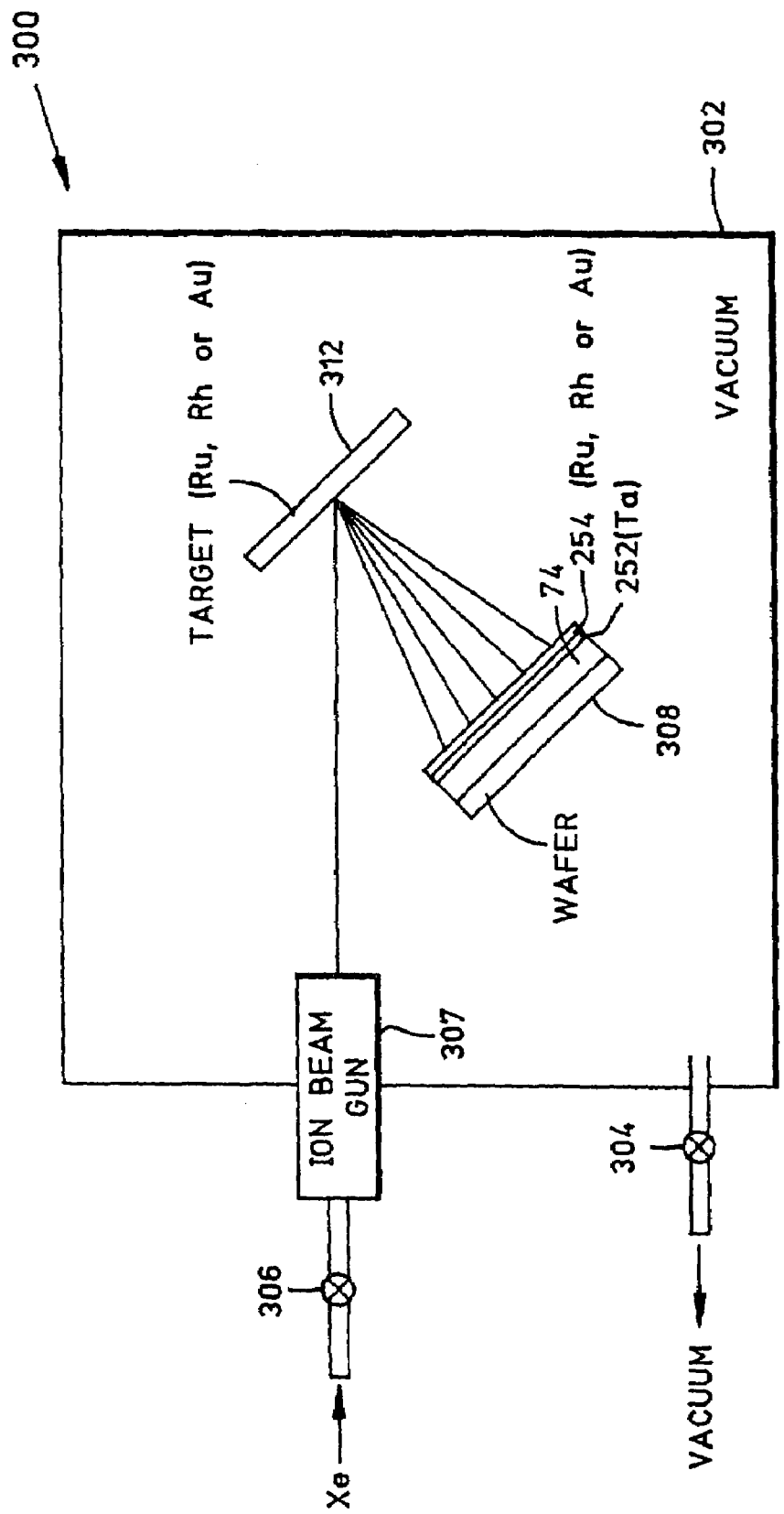
FIG. 15 is the same as FIG. 14 except the second layer of the cap layer structure is being sputtered.

The method of making the cap layer structure 250 in FIGS. 12 and 13 may be accomplished with a sputtering system 300 which is schematically illustrated in FIGS. 14 and 15. The sputtering system 300 includes a sputtering chamber 302 which has a valve controlled outlet 304 and a valve control inlet 306. The outlet 304 is for the purpose of drawing a vacuum in the chamber and the inlet 306 is for the purpose of introducing an inert gas, such as xenon (Xe), into an ion beam gun 307. Mounted within the chamber is a wafer 308 upon which layers of the read head, including the sensor 74, are formed. Opposite the wafer is a target 312 composed of the material to be sputter deposited on the wafer 310. The ion beam gun 307 may be mounted at one end of the chamber 302 for the purpose of directing a beam of ionized atoms onto the target 312. Within the ion beam gun high energy electrons collide with atoms, such as argon (Ar), krypton (Kr) or xenon (Xe) atoms, knocking out one of the electrons of each atom causing the atoms to be ionized with a positive charge. Electrons knocked out of the atoms can knock out additional electrons from other atoms which creates a plasma within the ion beam gun 314. Ionized atoms from the ion beam gun strike the target 312 which causes the material of the target to be sputtered and deposited on the wafer 310.

In FIG. 14 the CPP sensor 74 in FIG. 12 or 13, except for the cap layer structure 250, is fabricated on the wafer 308 in the sputtering chamber 300. The first cap layer 252 of tantalum (Ta) is formed on the sensor by sputtering tantalum from a tantalum target 312. This sputtering is done while the sputtering chamber 300 has a vacuum. In FIG. 15 the vacuum in FIG. 14 is maintained (not broken) while the second layer 254 of the cap structure of ruthenium (Ru), rhodium (Rh) or gold (Au) is sputtered on the first layer 252. Alternatively, the cap layer 252 can include Rh, Ru, Au or Ta deposited in multi-layer forms and in various orders of deposition, with a non-oxidizing material (eg. Ru, Rh or Au) as the top (last deposited) material. By maintaining the vacuum, oxygen ($O_2$) will not oxidize a top portion of the tantalum layer 252 thereby reducing the resistance of the tantalum layer to the current ($I_T$) through the sensor as discussed hereinabove.

Discussion

It should be understood that the pinned layer 202 may alternatively be an antiparallel (AP) pinned layer structure with first and second ferromagnetic layers, such as cobalt iron ($Co_{90}Fe_{10}$), separated by a thin (i.e. 8 Å) separation layer, such as ruthenium (Ru), which is fully described in commonly assigned U.S. Pat. No. 5,768,069. Still further, the AP pinned layer structure may be a soft pinned layer structure without a pinning layer. It should further be understood that while the ferromagnetic material of the pinned and free layers is preferably cobalt iron (CoFe) the invention can be practiced with other ferromagnetic materials, such as any cobalt based or nickel iron based materials.

It should be understood that the read head 72 may be employed in a tape drive (not shown) in lieu of the disk drive illustrated in FIGS. 1-5. With such a read head the surface facing the magnetic tape is referred to as a head surface instead of an air bearing surface (ABS).

Figure 16:
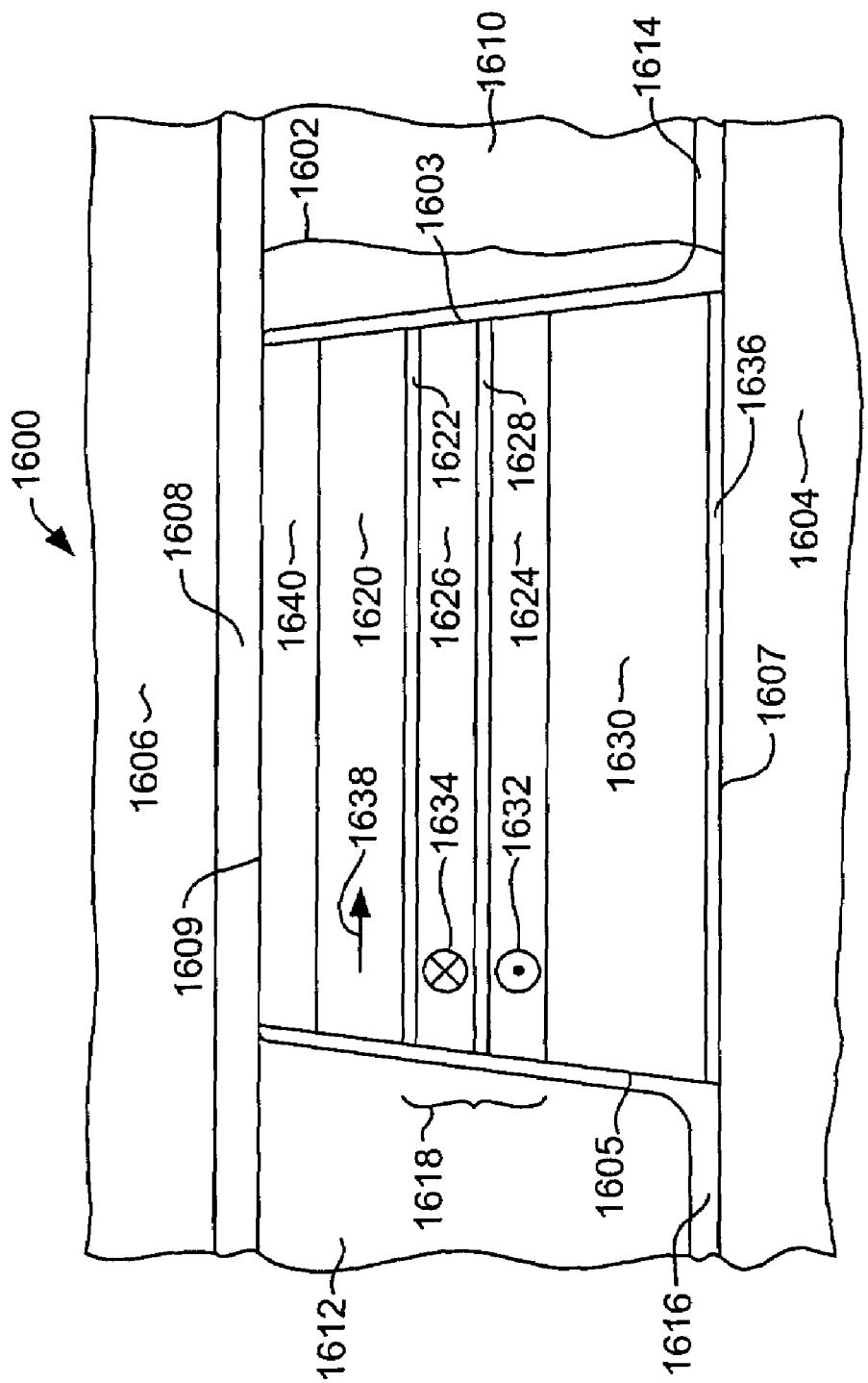
FIG. 16 is an ABS view of a CPP sensor according to another embodiment of the invention.

Non Corrosive Lead Structure for Current Perpendicular to Plane Sensor:

With reference now to FIG. 16, a current perpendicular to plane (CPP) sensor 1600 according to another embodiment of the invention includes a sensor stack 1602. The sensor stack has first and second laterally opposed side walls 1603, 1605 and has a first and second surfaces (top and bottom surfaces) 1607, 1609 that extend one side 1603 to the other 1605.

The sensor stack is formed between first and second magnetic shields 1604, 1606 and a non-corrosive lead 1608 is sandwiched between the second lead/shield 1606 and the sensor stack 1602. The shields 1604, 1606 can be constructed of, for example, NiFe or some other magnetic, electrically conductive material. The lead 1608 can be constructed of a material having a high resistance to corrosion, and may be constructed of, for example Ru, Rh, Au or some other suitable material.

First and second hard bias layers 1610, 1612 extend laterally from the sides of the sensor stack 1602, and can be constructed of a hard magnetic material such as CoPtCr or some similar material. First and second electrical insulation layers 1614, 1616 cover each of the sides 1603, 1605 and extend over the first shield 1604. The insulation layers, which may be constructed of, for example alumina, prevent sense current from being shunted through the hard bias layers 1610, 1612.

With continued reference to FIG. 16, the sensor stack 1602 includes a pinned layer 1618, a magnetic free layer 1620 and a thin non-magnetic, electrically insulating barrier layer 1622, constructed of, for example alumina sandwiched between the free layer 1620 and the pinned layer structure 1618. It should be pointed out at this point that the present invention could be embodied in a current perpendicular to plane giant magnetoresistive sensor (CPP GMR) in which case, the barrier layer 1622 would be replaced with a non-magnetic, electrically conductive spacer layer such as Cu. The free layer 1620 can be constructed of, for example NiFe, CoFe, Co or a combination of these or other materials.

The pinned layer 1618 can be of various configurations, but is preferably an antiparallel coupled (AP coupled) AFM pinned design, including first and second magnetic layers (AP1 and AP2) 1624, 1626 which are AP coupled across an AP coupling layer 1628 such as Ru. The AP1 layer can be exchange coupled with a layer of antiferromagnetic material (AFM layer) 1630. This exchange coupling strongly pins the magentization 1632 of the AP1 layer in a desired direction perpendicular to the ABS and the antiparallel coupling between the AP1 and AP2 layers pins the magnetization 1634 of the AP2 layer 1626 in an opposite direction perpendicular to the ABS. The AP1 and AP2 layers 1624, 1626 can be constructed of, for example, CoFe or some other magnetic material. A seed layer 1636 may be provided at the bottom of the sensor stack to initiate a desired crystalline growth in the above deposited sensor layers.

A magnetic bias field from the hard bias layers 1610, 1612 biases the magnetization 1638 of the free layer in a desired direction parallel with the ABS while leaving the magnetization 1638 free to rotate in the response to a magnetic field, such as from a magnetic medium.

With continued reference to FIG. 16, the sensor stack 1602 includes a capping layer 1640, which protects the sensor layers from damage during manufacture. The capping layer 1640 forms the top or second surface 1609 of the sensor stack 1602, and extends from the first lateral side 1603 to the second lateral side 1605, terminating at the sides 1603, 1605. The capping layer 1640 can be constructed of, for example Ta. Alternatively, the capping layer can be constructed of an electrically conductive material having a high resistance to corrosion, such as Ru, Rh, Au or some other material. The capping layer 1640 can also be constructed of a layer of Ta and a layer of another material such as Ru, Rh, Au or some other material. If constructed as such a multilayer structure, the capping layer 1640 can have the layer of Ta deposited first (at the bottom) and the other layer (Ru, Rh, Au, etc) formed deposited after the Ta (ie. at the top). In that manner, the top layer can prevent the Ta from corroding prior to deposition of the lead 1608.

With reference still to FIG. 16, the lead 1608 can be constructed of an electrically conductive material having a high resistance to corrosion or having an oxide that is electrically conductive. For example, the lead layer 1608 can be constructed of Ru, Rh, Au or some similar material. In one embodiment, the lead 1608 is preferably constructed of Ru or Rh.

The lead 1608 provides an electrically conductive interface with the cap layer, that also prevents corrosion from increasing parasitic resistance in either the lead 1608, capping layer 1640 or the interface between the lead 1608 and capping layer 1640. The electrically conductive, magnetic shield 1606 (such as NiFe) can then be deposited over the lead 1608 to provide magnetic shielding, and also additional electrical conduction for the delivery of sense current to the sensor.

Figure 17:
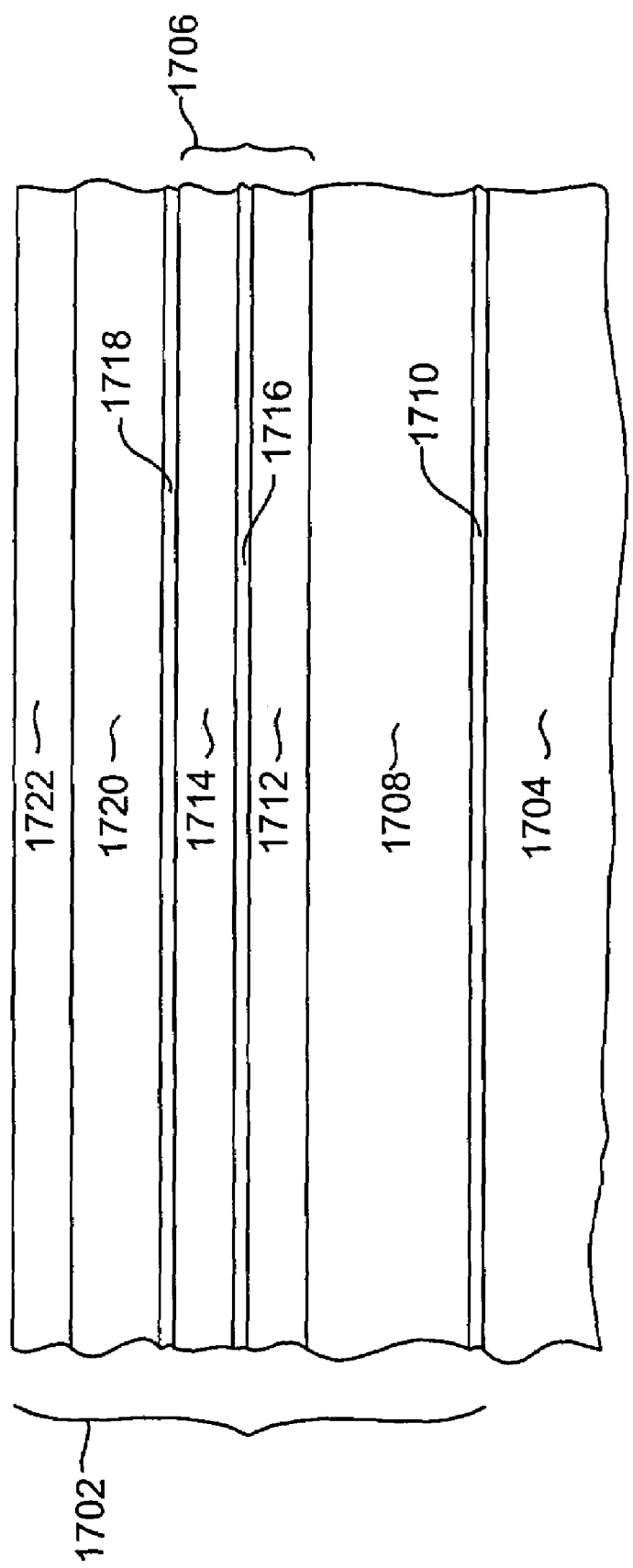
FIGS. 17-22 are views of a CPP sensor shown in various intermediate stages of manufacture, illustrating a method of constructing a CPP sensor according to an embodiment of the invention.

With reference now to FIGS. 17-22 a method for constructing the sensor described above will be illustrated. With particular reference to FIG. 17, a plurality of sensor layers 1702 are deposited over a substrate 1704. The substrate can be a first electrical lead/shield constructed of a material such as NiFe. The sensor layers can be deposited by sputtering in a sputter deposition chamber as described in more detail above. The sensor layers can include a pinned layer structure 1706 formed over an AFM layer 1708. The AFM layer 1708 can be constructed on top of a seed layer 1710 that is chosen to initiate a desired grain growth in the above deposited layers. As described above with reference to FIG. 16, the pinned layer structure can include AP1 and AP2 layers 1712, 1714 that are separated from one another by a coupling layer 1716.

An electrically insulating barrier layer 1718 is deposited over the pinned layer structure. A magnetic free layer 1720 is deposited over the barrier layer 1718 (or conductive spacer layer), and a capping layer 1722 is deposited over the free layer 1720. The capping layer 1722 can be formed by depositing a layer of a material such as Ta, Ru, Rh, Au or some other suitable material. The capping layer 1722 can also be formed by depositing a layer of Ta and then depositing a layer of a material such as Ru, Rh, Au, etc.

Figure 18:
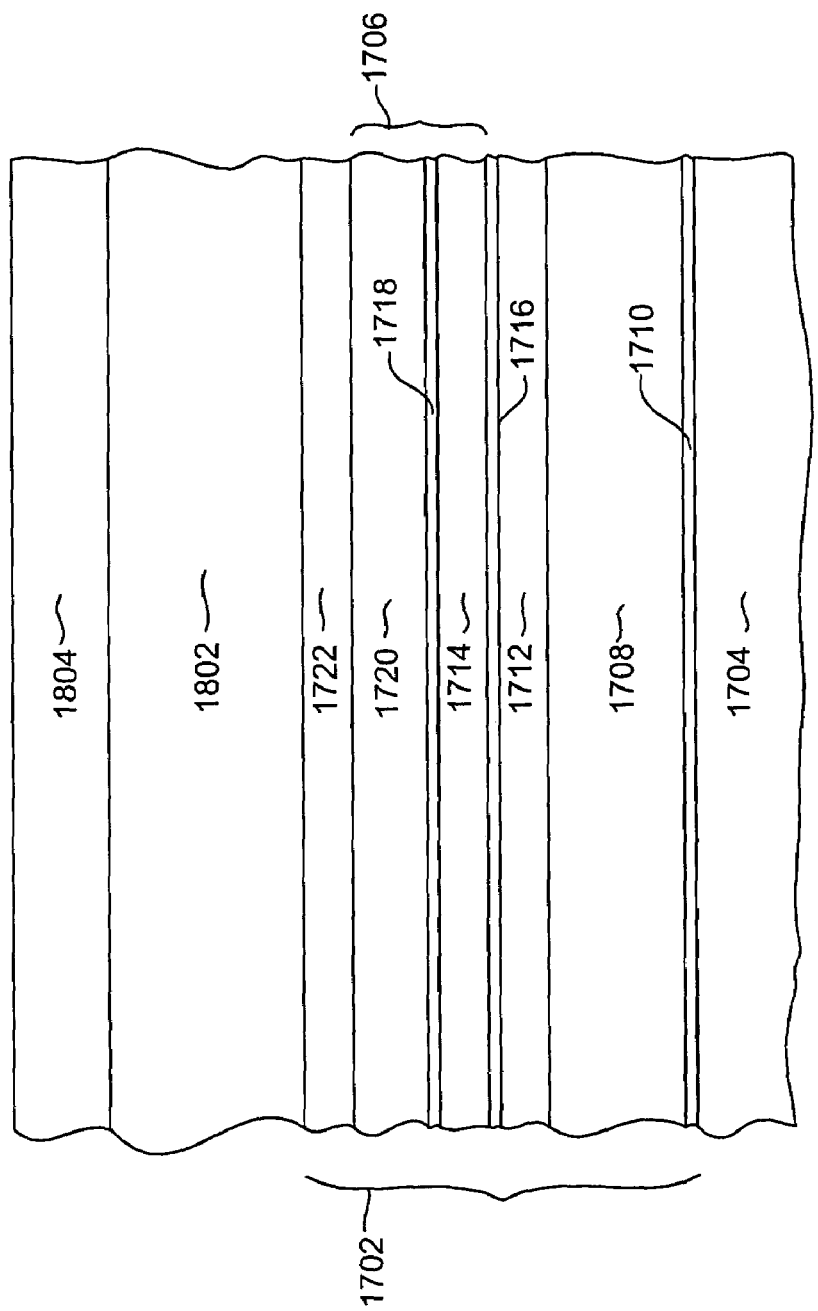

With reference now to FIG. 18, mask material is deposited over the sensor layers 1702. The mask material layers may include an image transfer layer 1802 and a layer of photosensitive material 1804 formed over the image transfer layer 1802. The image transfer layer 1802 can be a soluble polyimide material, such as DURIMIDE®. The photosensitive material can be photoresist. Other layers, such one or more hard mask layers may be deposited as well.

Figure 19:
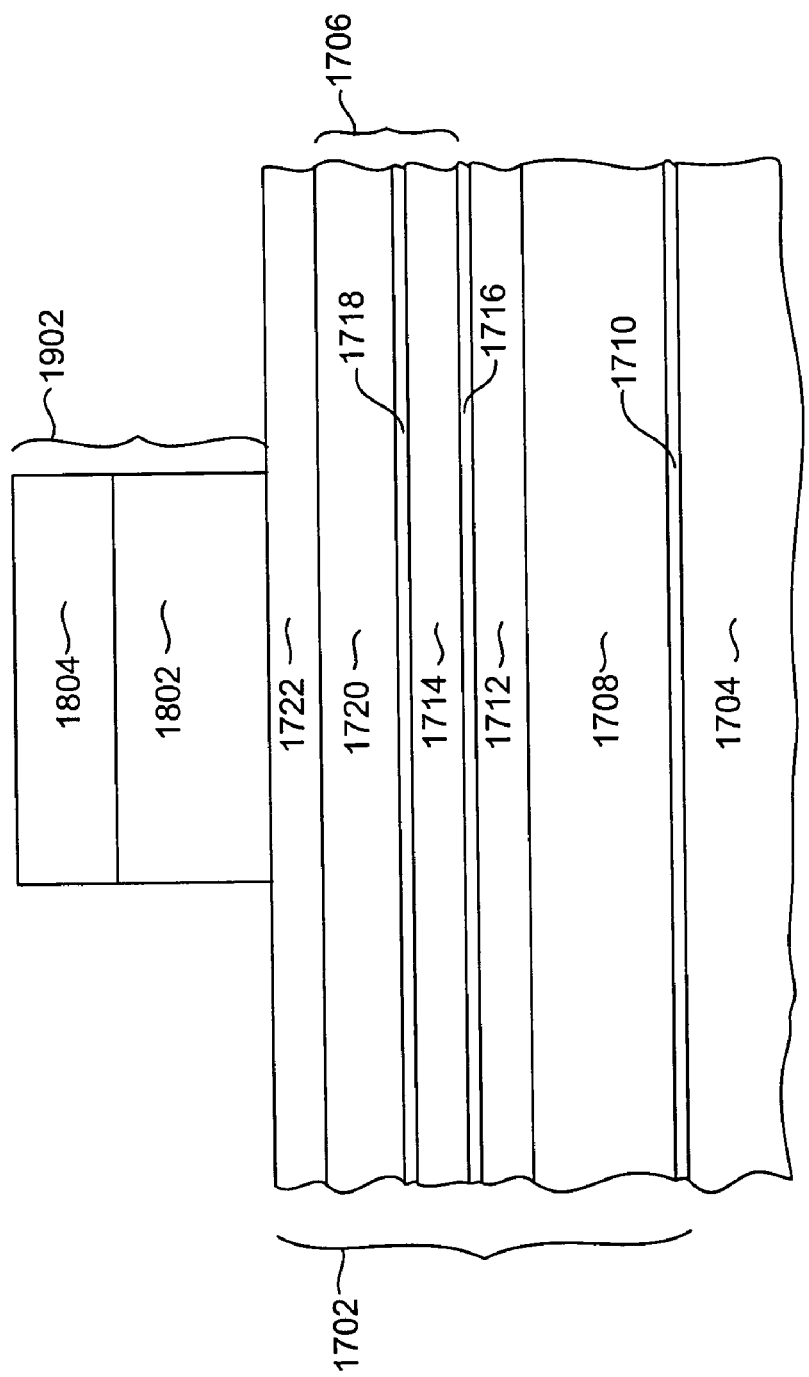

With reference now to FIG. 19, the mask layers 1802, 1804 are patterned to form a mask structure 1902 defines the track width of the sensor. The mask 1902 can be patterned by photolithgraphically patterning the photosensitive layer 1804 and then performing a material removal procedure such as RIE to remove portions of the image transfer layer 1802 that are not covered by the photosensitive layer 1804.

Figure 20:
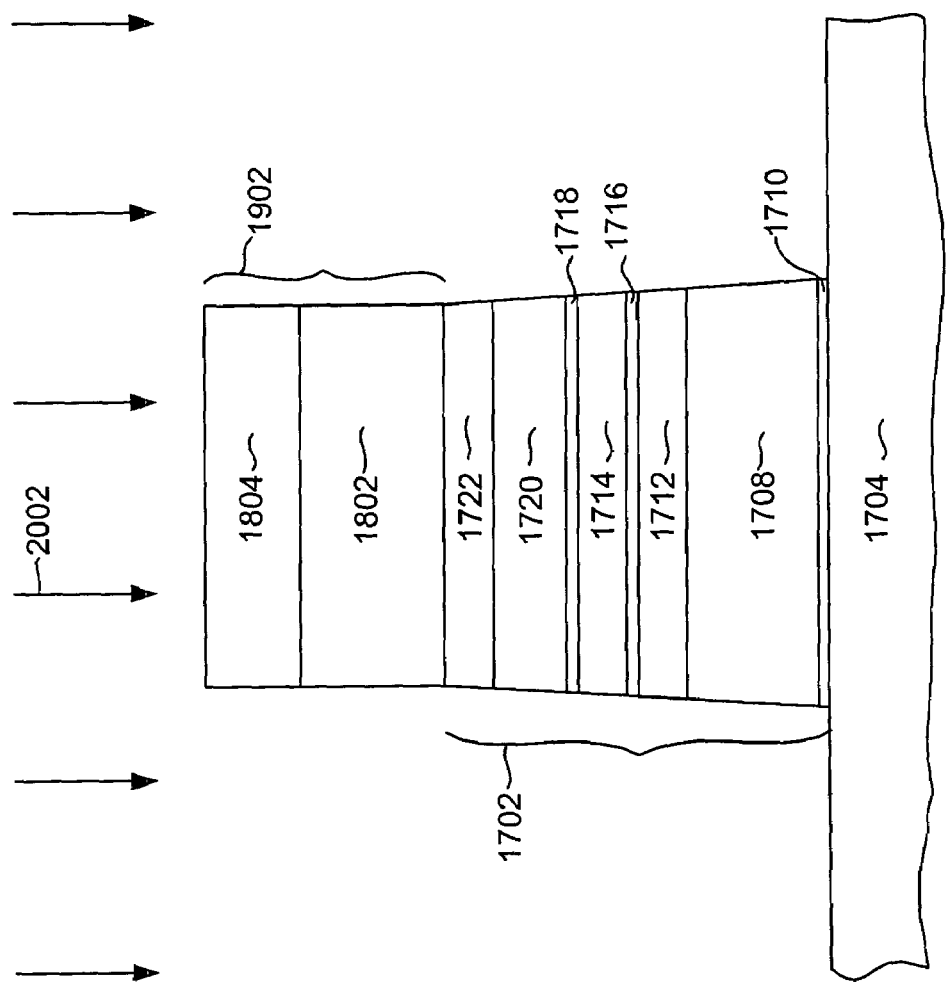

With reference now to FIG. 20 an ion mill 2002 is performed to remove portions of the sensor material layers 1702 that are not protected by the mask structure 1902. It should be pointed out that the ion milling may actually include multiple ion mills performed at varying angles with respect to the layers in order to define the sides of the sensor and then remove and re-deposited material that may have formed on the sides of the sensor. It should also be pointed out that a similar masking and ion milling procedure would be used to define the stripe height (back edge away from the ABS) of the sensor.

Figure 21:
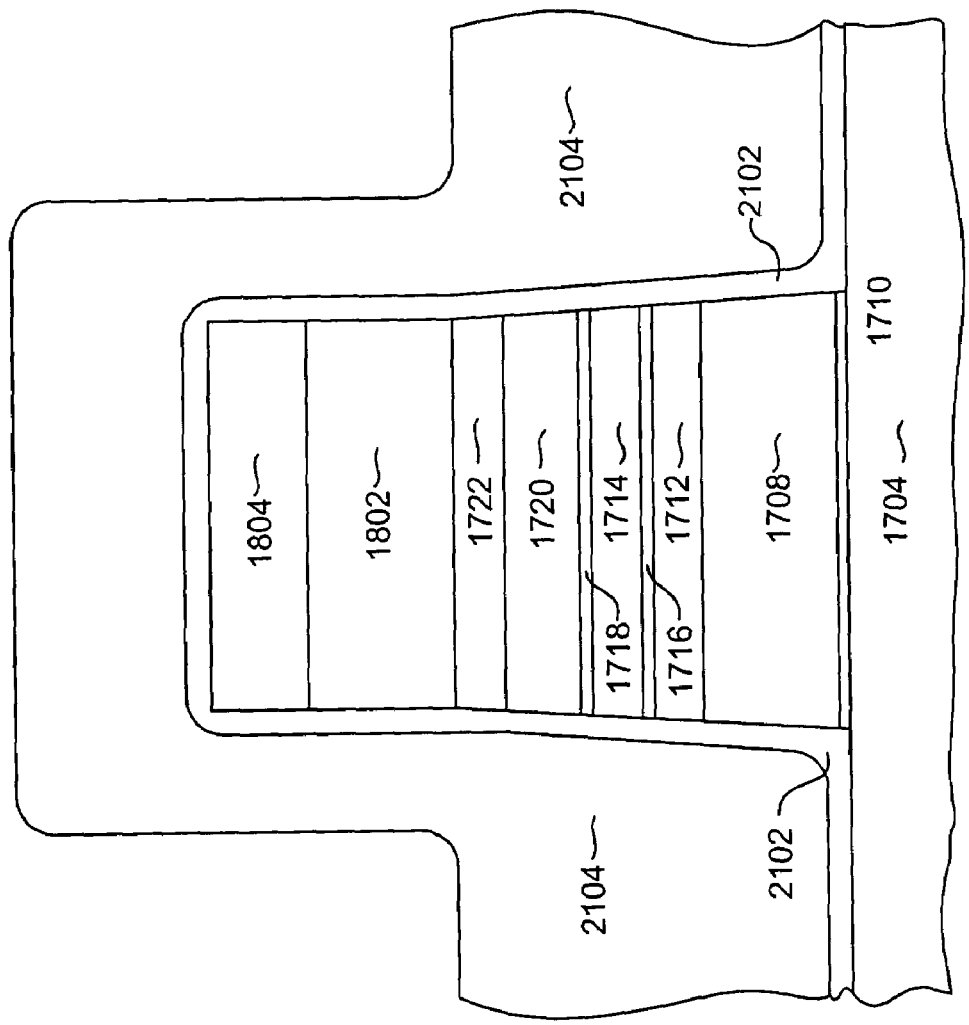

Then, with reference to FIG. 21 a thin layer of electrically insulating material 2102 is deposited. The insulating material 2102 can be, for example alumina ($Al_2O_3$) and is preferably deposited by a conformal deposition method such as atomic layer deposition (ALD), chemical vapor deposition (CVD) etc. A layer of magnetically hard material 2104 is deposited over the insulation layer 2102. The hard magnetic material is preferably deposited to a thickness of at least the free layer 1720, and preferably to the top of the cap layer 1722.

Figure 22:
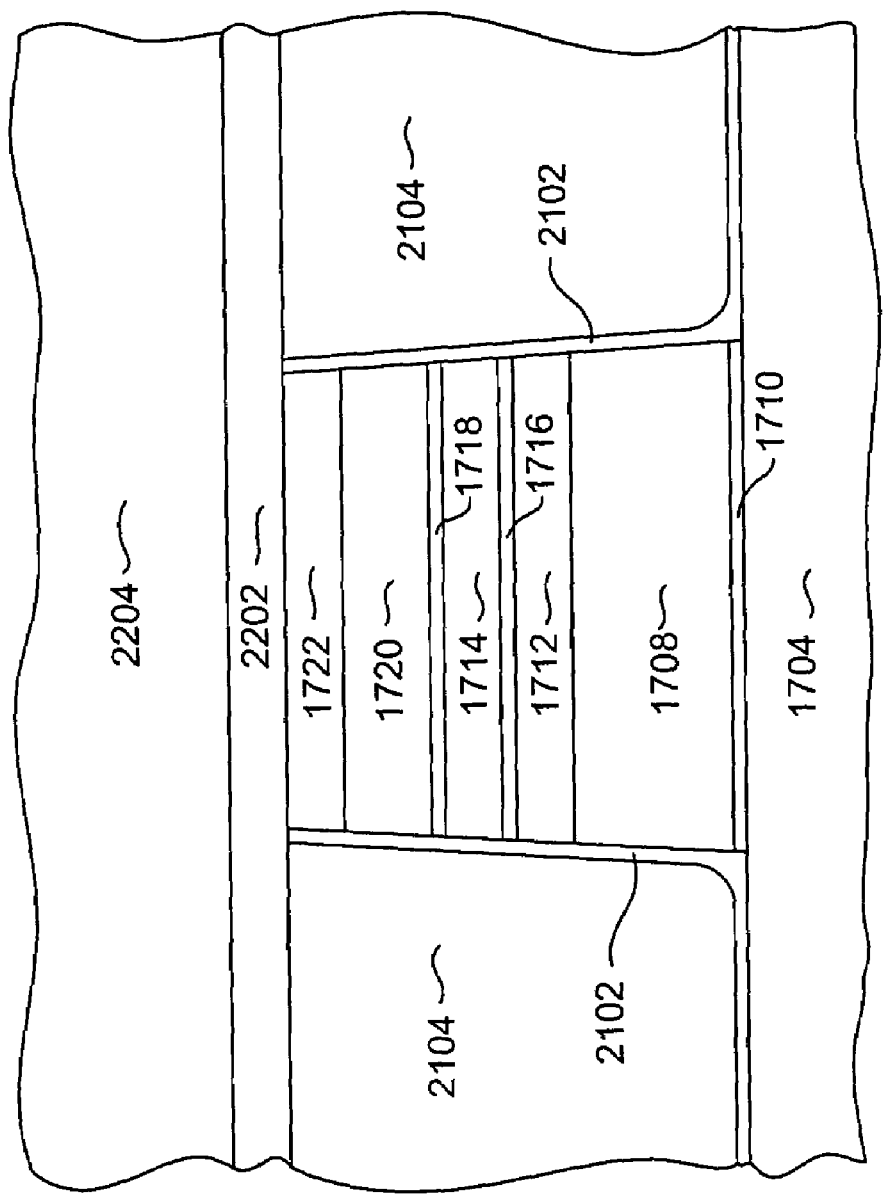

With reference to FIG. 22, a chemical mechanical polishing process is performed to remove the mask layers 1802, 1804 (FIG. 21) and provide a smooth planar surface across the capping layer 1722, insulation layer 2102 and hard bias layers 2104. Then, an electrically conductive lead material 2202 is deposited. The lead material 2202 can be for example Ru, Rh, Au or some other material that is electrically conductive and resistant to corrosion or has an electrically conductive oxide. Then, a layer of magnetic shield material such as NiFe 2204 is deposited over the lead layer 2202.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings. For example, although the sensor stack 1602 described with reference to FIG. 16 shows the pinned layer 1618 being beneath the free layer 1620, it could be above the free layer 1620. Other embodiments will, no doubt become evident as well to those skilled in the art and would also fall within the scope of the invention.

What is claimed is:

1. A current perpendicular to plane (CPP) magnetoresistive sensor, comprising:
a sensor stack having first and second laterally opposed sides, the sensor stack further having a free magnetic layer, and a capping layer, wherein the capping layer further comprises a layer of Ta adjacent to the free magnetic layer and a first non-corrosive electrically conductive layer formed adjacent to the layer of Ta, the entire capping layer extending between and terminating at the first and second sides of the sensor stack;
a non-corrosive, electrically conductive lead layer formed adjacent to and in electrical contact with the capping layer, the non-corrosive, electrically conductive lead layer comprising a second layer of non-corrosive, electrically conductive material that extends beyond the first and second sides of the sensor stack, and
an electrically conductive, magnetic shield layer contacting the electrically conductive lead, the electrically conductive, magnetic shield layer extending beyond the first and second sides of the sensor stack.

2. A magnetoresistive sensor as in claim 1, wherein the first non-corrosive electrically conductive layer comprises Ru, Rh or Au.

3. A magnetoresistive sensor as in claim 1, wherein the first and second non-corrosive electrically conductive layer each comprise a material selected from the group consisting of Rh, Ru and Au.

4. A magnetoresistive sensor as in claim 1, wherein:
the first and second non-corrosive electrically conductive material layers each comprise Rh or Ru.

5. A current perpendicular to plane (CPP) magnetoresistive sensor, comprising:
a sensor stack having first and second laterally opposed sides including a magnetic pinned layer, a magnetic free layer, a non-magnetic, electrically insulating barrier layer sandwiched between the free layer and the pinned layer and a capping layer formed adjacent to the free layer and opposite the barrier layer, the sensor stack having a first and second laterally opposed sides and first and second surfaces each extending from the first side to the second side;
first and second electrically conductive, magnetic shields, the sensor stack being disposed between the first and second shields;
an non-corrosive, electrically conductive lead layer sandwiched between and in electrical contact with the second shield and the capping layer, wherein the electrically conductive lead comprises a material selected from the group consisting of Rh and Ru; wherein
the capping layer extends between and terminates the first and second laterally opposed sides, the capping layer further comprising a layer of Ta adjacent to the magnetic free layer and a first layer of non-corrosive electrically conductive material; and
the non-corrosive, electrically conductive lead layer comprises a second layer of non-corrosive, electrically conductive material that extends beyond the first and second sides of the sensor stack.

6. A magnetoresistive sensor as in claim 5 wherein the first layer of non-corrosive, electrically conductive material comprises Ru, Rh or Au.

7. A magnetoresistive sensor as in claim 5 wherein the first and second non-corossive, electrically conductive layers each comprise a material selected from the group consisting of of Ru, Rh, and Au.

8. A magnetoresistive sensor as in claim 5 wherein the first and second non-corrosive, electrically conductive layers each comprise Rh or Rh.

9. A magnetoresistive sensor as in claim 5 wherein the second shield comprises NiFe.

10. A magnetoresistive sensor as in claim 5 wherein the first and second shields comprise NiFe.

11. A disk drive for magnetic data recording, the disk drive comprising:
  a housing;
  a magnetic disk rotatably mounted within the housing;
  an actuator pivotally held within the housing;
  a slider connected with the actuator for movement adjacent to a surface of the magnetic disk;
  a current perpendicular to plane (CPP) magnetoresistive sensor connected with the slider, the sensor comprising:
  a sensor stack having first and second laterally opposed sides, and including a magnetic pinned layer, a magnetic free layer, a non-magnetic, electrically insulating barrier layer sandwiched between the free layer and the pinned layer and a capping layer formed adjacent to the free layer and opposite the barrier layer, the sensor stack having a first and second laterally opposed sides and first and second surfaces each extending from the first side to the second side;
  first and second electrically conductive, magnetic shields, the sensor stack being disposed between the first and second shields;
  an non-corrosive, electrically conductive lead layer sandwiched between and in electrical contact with the second shield and the capping layer, wherein the electrically conductive lead comprises a material selected from the group consisting of Rh and Ru; wherein
  the capping layer extends between and terminates the first and second laterally opposed sides, the capping layer further comprising a layer of Ta adjacent to the magnetic free layer and a first layer of non-corrosive electrically conductive material; and
  the non-corrosive, electrically conductive lead layer comprises a second layer of non-corrosive, electrically conductive material that extends beyond the first and second sides of the sensor stack.

12. A disk drive as in claim 11 wherein the first and second layer of non-corrosive, electrically conductive material each comprise a material selected from the group consisting of Rh, Ru and Au.

* * * * *